(12) United States Patent
Whitaker et al.

(10) Patent No.: US 11,913,273 B2
(45) Date of Patent: Feb. 27, 2024

(54) MOTORIZED DOOR ASSEMBLY WITH SAFETY FEATURES FOR HEATED CABINET

(71) Applicant: APEX INDUSTRIAL TECHNOLOGIES LLC, Mason, OH (US)

(72) Inventors: Craig Whitaker, Fairfield, OH (US); Edward Leonard Weaver, II, Milford, OH (US); Scott A. Zieker, Cincinnati, OH (US); Charles Eldon Warner, Cincinnati, OH (US); Ronald G. Knollman, Mt. Healthy, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

(21) Appl. No.: 15/980,063

(22) Filed: May 15, 2018

(65) Prior Publication Data

US 2018/0328099 A1    Nov. 15, 2018

Related U.S. Application Data

(60) Provisional application No. 62/506,493, filed on May 15, 2017.

(51) Int. Cl.
*E05F 15/20* (2006.01)
*E05F 15/73* (2015.01)
(Continued)

(52) U.S. Cl.
CPC .............. *E05F 15/73* (2015.01); *E05F 15/40* (2015.01); *E05F 15/41* (2015.01); *E05F 15/43* (2015.01);
(Continued)

(58) Field of Classification Search
CPC .......... F16D 7/044; F16D 7/046; F16D 7/048; F16D 7/025; E05F 15/614; E05F 15/53;
(Continued)

(56) References Cited

U.S. PATENT DOCUMENTS 3,785,089 A    1/1974  Smith
3,974,117 A *  8/1976  Illmann ................. C08F 220/14
                                                524/824

(Continued)

FOREIGN PATENT DOCUMENTS

DE         9319914 U1      3/1994
DE         29811584 U1    11/1999
(Continued)

OTHER PUBLICATIONS

PCT, U.S. Patent and Trademark Office (ISA/US), International Search Report and Written Opinion of the International Searching Authority, International Application No. PCT/US2018/032698, 11 pages, dated Oct. 16, 2018.

(Continued)

*Primary Examiner* — Chi Q Nguyen
(74) *Attorney, Agent, or Firm* — Thompson Hine LLP

(57) ABSTRACT

Motorized door assemblies having a door pivoting about a pivot axis extending across opposing jambs. In one aspect, the assembly includes a motor assembly having a motor, drive gears, slip clutch, and driven shaft connected to the door to pivot it about the pivot axis. The slip clutch includes a clutch plate slideable along the driven shaft, a drive plate driven by the motor via the drive gears, and a clutch spring urging the clutch plate into engagement with the drive plate, where the clutch and drive plates have profiled and counter-profiled faces. In another aspect, a break beam emitter and receiver are mounted to respective ones of the opposing jambs along a beam axis extending parallel to the pivot axis (Continued)

and proximate to an edge of the door opposite the pivot axis. Interruption of a light beam projected therebetween alters operation of a motor assembly.

19 Claims, 8 Drawing Sheets

(51) Int. Cl.
| | |
|---|---|
| *E05F 15/611* | (2015.01) |
| *F16D 7/02* | (2006.01) |
| *E05F 15/40* | (2015.01) |
| *E05F 15/43* | (2015.01) |
| *E05F 15/41* | (2015.01) |
| *E05F 15/614* | (2015.01) |
| *F16D 7/04* | (2006.01) |

(52) U.S. Cl.
CPC .......... *E05F 15/611* (2015.01); *E05F 15/614* (2015.01); *F16D 7/025* (2013.01); *F16D 7/044* (2013.01); *E05F 2015/435* (2015.01); *E05F 2015/765* (2015.01); *E05Y 2201/216* (2013.01); *E05Y 2600/41* (2013.01); *E05Y 2900/308* (2013.01)

(58) Field of Classification Search
CPC ... E05F 15/611; E05F 15/43; E05F 2015/435; E05F 15/00; E05F 15/73; E05F 15/40; E05F 15/41; E05F 2015/765; E05Y 2201/216; E05Y 2600/41; E05Y 2600/13; E05Y 2900/308; A47F 2003/008; Y10T 74/18784
USPC ..... 49/349, 322, 342, 334, 332, 341, 31, 42, 49/43; 74/89.13
See application file for complete search history.

(56) References Cited

U.S. PATENT DOCUMENTS

| | | | | |
|---|---|---|---|---|
| 4,289,995 | A | | 9/1981 | Sorber et al. |
| 4,922,168 | A | | 5/1990 | Waggamon et al. |
| 5,221,239 | A | * | 6/1993 | Catlett .................. E05F 15/614 475/342 |
| 5,243,735 | A | | 9/1993 | O'Brien, II |
| 5,524,738 | A | | 6/1996 | Erlebach et al. |
| 5,878,530 | A | * | 3/1999 | Eccleston ............... E05F 15/63 49/139 |
| 6,002,217 | A | * | 12/1999 | Stevens ................. E05F 15/611 318/9 |
| 6,575,277 | B1 | * | 6/2003 | Torii ...................... E05F 11/505 192/12 B |
| 6,734,648 | B2 | * | 5/2004 | Fukumura ............... E05B 81/20 318/468 |
| 7,310,911 | B1 | | 12/2007 | Sellman | 
| 7,791,204 | B2 | * | 9/2010 | Hayashi .............. H01L 21/4853 257/773 |
| 8,181,763 | B2 | * | 5/2012 | Gresley ................ H02K 7/1166 192/223.2 |
| 8,225,458 | B1 | * | 7/2012 | Hoffberg ................. E05F 3/102 16/49 |
| 2002/0026750 | A1 | * | 3/2002 | St. John ................ E05F 15/603 49/332 |
| 2011/0252597 | A1 | | 10/2011 | Burris et al. |
| 2013/0098184 | A1 | | 4/2013 | Cianetti |
| 2013/0133447 | A1 | | 5/2013 | Leivenson et al. |
| 2017/0247930 | A1 | * | 8/2017 | Heidrich ............... E05F 15/652 |

FOREIGN PATENT DOCUMENTS

| | | |
|---|---|---|
| DE | 102006029902 A1 | 1/2008 |
| DE | 102010019357 | 11/2011 |
| EP | 0436486 | 7/1991 |
| EP | 1 321 619 A2 | 6/2003 |
| EP | 1 767 865 A2 | 3/2007 |
| EP | 2009210 A2 | 12/2008 |
| EP | 2 017 423 | 1/2009 |
| EP | 2009210 A3 | 2/2012 |
| GB | 2365063 A | 2/2002 |
| WO | 0156142 A1 | 8/2001 |

OTHER PUBLICATIONS

Australian Government—IP Australia, Examination Report No. 1, Australian Patent Application No. 2018270923, 5 pages (dated Dec. 16, 2020).
Canadian Intellectual Property Office, Examination Report issued for Canadian Patent Application No. 3,062,864, 4 pages (dated Feb. 23, 2021).
AU, Australian Patent Office, Examination Report No. 2 issued in Australian Patent Application No. 2018270923, 4 pages (dated Jun. 3, 2021).
EP, European Patent Office, Supplementary European Search Report; issued for European Patent Application No. 18802954.0, 12 pages (dated Feb. 26, 2021).
European Patent Office, Communication Pursuant to Rules 70(2) and 70a(2) EPC and Extended Search Report, European Patent Application No. 18802954.0, 12 pages, dated Jun. 22, 2021.
Canadian IP Office, Canadian Examination Report dated Feb. 16, 2023 pertaining to Canadian Divisional Patent Application No. 3,145,014 filed Jan. 7, 2022. 5 pages.
Australian IP Office, Australian Examination Report dated May 10, 2023 pertaining to Australian Divisional Patent Application No. 2022200767 filed May 15, 2019. 4 pages.
Canadian Patent Office, Canadian Examination Report dated Jul. 18, 2023 pertaining to Canadian Divisional Patent Application No. 3,145,014 filed Jan. 7, 2022. 4 pages.
European Patent Office, Extended European Search Report dated Aug. 28, 2023 which pertains to European Patent Application No. 23178834.0 filed May 15, 2018. 8 pages.

* cited by examiner

MOTORIZED DOOR ASSEMBLY WITH SAFETY FEATURES FOR HEATED CABINET

The present application is directed to cabinets and enclosures for the dispensing of items and, more particularly, to a motorized door assembly for installation in heated cabinets and enclosures that includes heat-tolerant safety features to prevent pinching injury.

BACKGROUND

Cabinets and enclosures including internal compartments for holding items such as foodstuffs have been used in concepts such as the "automat." Automats may include multi-tiered, locker-like cabinets and use a central controller to control the operation of individual access doors based upon a payment or other authorization, unlocking a particular access door and allowing a customer manual access to a foodstuff stored within a particular compartment.

When dispensing foodstuffs, the customer is generally required to open an access door and to reach within an enclosed space in order to retrieve their purchase. The customer then, usually, closes the door and leaves with their purchase. If an access door is not closed, there is often little consequence. However, when dispensing heated foodstuffs, such as a pizza that would be held at temperatures of about 140° F. to about 165° F. (60 C to 74 C), the open access door permits substantial heat to escape into the customer pick-up area, compromising environmental control, increasing energy consumption, and potentially creating a safety hazard. On the other hand, automatically closing an access door risks inflicting a "pinching injury" upon a customer who may still be reaching within the enclosed space due to inattention, inadvertent delay, or difficulty in removing their purchase.

SUMMARY

This application discloses a motorized door assembly for use with heated cabinets. In a first aspect, the door assembly includes a slip clutch serving to control the closing force of a door. The slip clutch includes a spring-loaded, profiled clutch plate face engaging a counter-profiled drive plate face to limit the maximum torque transmissible to a driven shaft from an electric motor of the assembly. In a second aspect, the door assembly includes a break beam emitter and break beam receiver for installation on a door-opening side of door frame jambs proximate to, but not adjoining, the door's opened and/or closed position, where interruption of the break beam disables or reverses operation of the electric motor of the assembly. The break beam devices each include a light pipe adjoining the beam-emitting and beam-receiving electronics, respectively, to space the electronics apart from the door side of the door jamb(s) and protect the electronics from conductive and convective heat transfer from the heated compartment. Either or both aspects may be employed to allow automatic control of a door to a heated compartment while reducing the potential for pinching injury by the motorized door assembly.

In a first aspect, disclosed is a motorized door assembly including a door positioned between opposing jambs of a door frame and movable between an open position and a closed position, where the door pivots about a pivot axis extending across the opposing jambs. The door assembly also includes a motor assembly mounted adjacent to the door, and having an electric motor, a plurality of drive gears, a slip clutch, and a driven shaft operably connected to the door to pivot the door about the pivot axis. The slip clutch includes a clutch plate that is slideable along the driven shaft, a drive plate driven by the electric motor via the drive gears, and a clutch spring urging the clutch plate into engagement with the drive plate, with the clutch plate having a profiled face and the drive plate having a counter-profiled face for engagement with the profiled face.

In a second aspect, disclosed is a motorized door assembly including a door positioned between opposing jambs of a door frame and movable between an open position and a closed position, where the door pivots about a pivot axis extending across the opposing jambs. The door assembly also includes a motor assembly operably connected to the door to pivot the door about the pivot axis, a control board controlling the motor assembly, a first break beam emitter mounted to one of the opposing jambs and operatively connected to the control board, and a first break beam receiver mounted to another of the opposing jambs and operatively connected to the control board. The first break beam emitter and first break beam receiver are disposed along a beam axis extending parallel to the pivot axis and proximate to an edge of the door opposite the pivot axis. Interruption of a light beam projected along the beam axis between the first break beam emitter and the first break beam receiver alters a signal of the operative connections to the control board, whereupon the control board alters operation of the motor assembly.

DETAILED DESCRIPTION

Figure 1A:
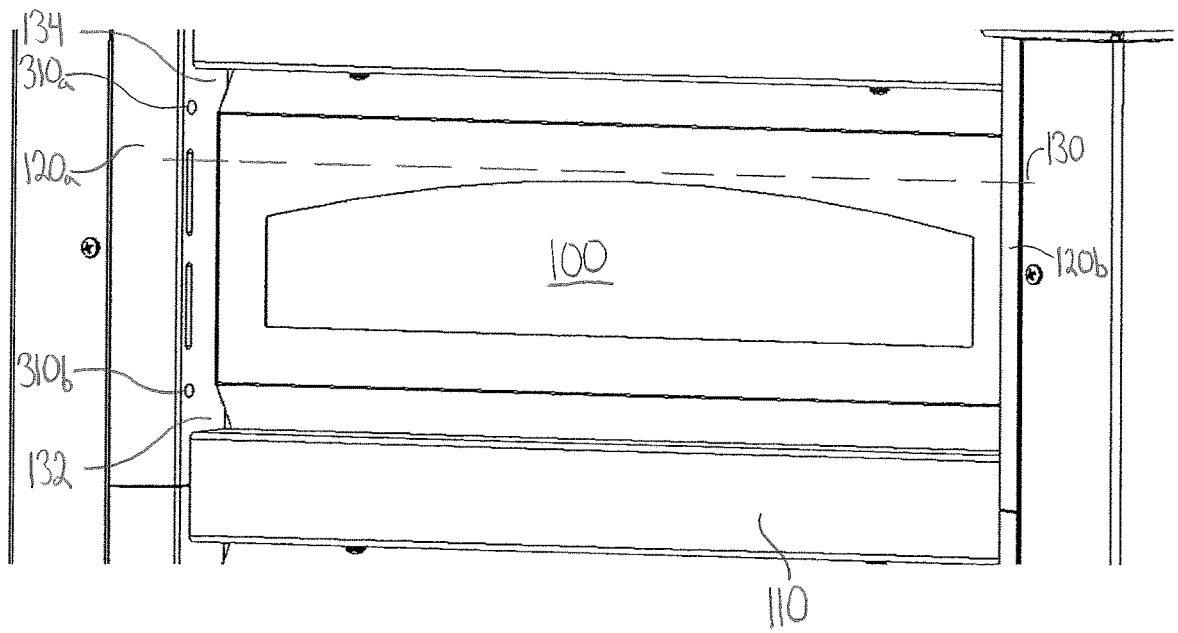
FIGS. 1A and 1B are front views of a heated cabinet including a motorized door assembly, with each view offset to one side to show the jamb of the other side of the door frame.
Figure 1B:
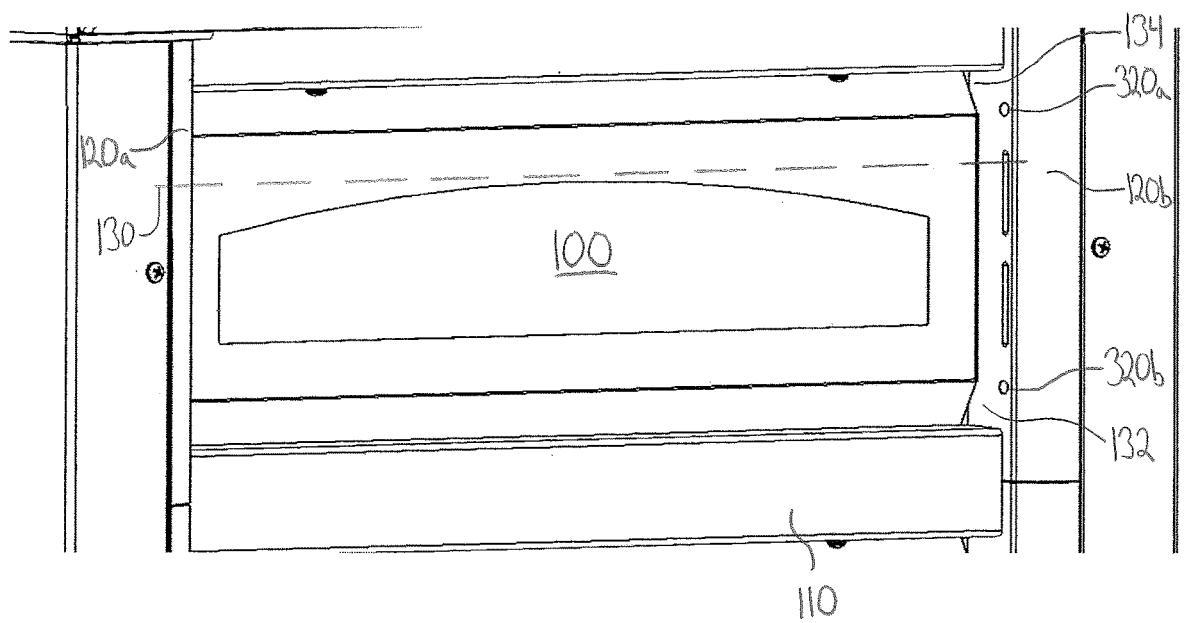

As shown in FIGS. 1A and 1B, the devices disclosed herein are elements of a motorized door assembly including a door 100 that is movable between an open position and a closed position within a door frame 110. The door 100 is positioned between opposing jambs 120a and 120b of the door frame 110, which may be elements of a door assembly module or elements of a cabinet in which the door and other elements of the motorized door assembly are installed. The door may be positioned between a head and a sill (including, for the purposes of this application, any fixed rails or other structures separating doors within a vertical stack of doors), between a head and a lower door, between an upper door and a sill, or between upper and lower doors in a vertical stack of doors, depending upon the arrangement and number of compartments provided in a particular cabinet. The door 100 pivots about an axis 130, such as the illustrated axis adjacent to the top of the door 100 or, alternately, an axis adjacent to the bottom of the door. Consequently, the door 100 creates at least two potential pinch points 132 and 134. A first pinch point 132 is created along the edge of the door opposite the pivot axis 130 where closure of the door may potentially capture an extremity such as a finger, hand, or forearm of a customer reaching within the enclosed space of a compartment. A second pinch point 134 is created near the edge of the door adjacent to the pivot axis 130 where opening of the door may potentially capture an extremity such as the finger of a customer resting their hand against the door frame between the edge or external face of the door and an adjacent head, sill, or other door.

Figure 2:
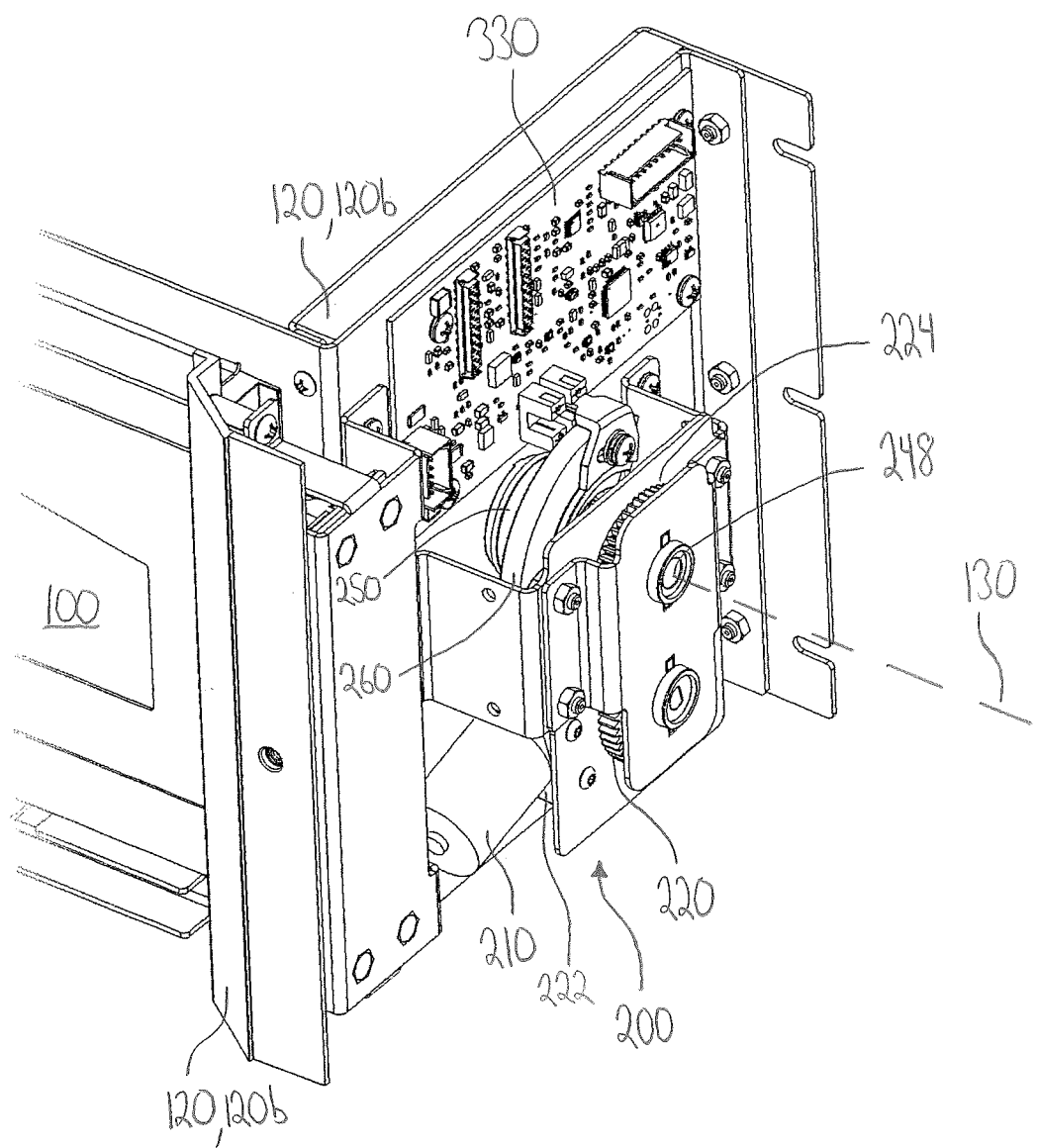
FIG. 2 is a perspective view of a motor assembly mounted between the right side jamb of FIGS. 1A and 1B and the exterior of a cabinet (not shown).

In a first aspect, FIG. 2 shows a motor assembly 200 mounted to a jamb 120, specifically the right side jamb 120*b* of FIGS. 1A and 1B opposite the door 100. It will be appreciated that the aspect is not restricted to this specific, illustrated mounting. The motor assembly 200 includes an electric motor 210, a plurality of drive gears 220, a driven shaft 230, and a slip clutch 240 (the driven shaft 230 and slip clutch 240 being shown in FIGS. 3B, and 4-6). The electric motor is preferably oriented perpendicular to the pivot axis 130 of the door 100, allowing the motor assembly 200 to have relatively low profile or width and thus allow for a relatively narrow cabinet side wall, with the plurality of drive gears 220 including a so-called "right angle gearbox" or "90 degree gearbox" 222 (best shown in FIG. 4). In the illustrated construction the driven shaft 230 and pivot axis 130 are coaxial, however it will be appreciated that the driven shaft 230 may connect to a driven gear assembly, multi-point linkage, or other mechanism disposed on the door side of the jamb 120 for pivoting the door 100 about a non-coaxial pivot axis 130.

Figure 3A:
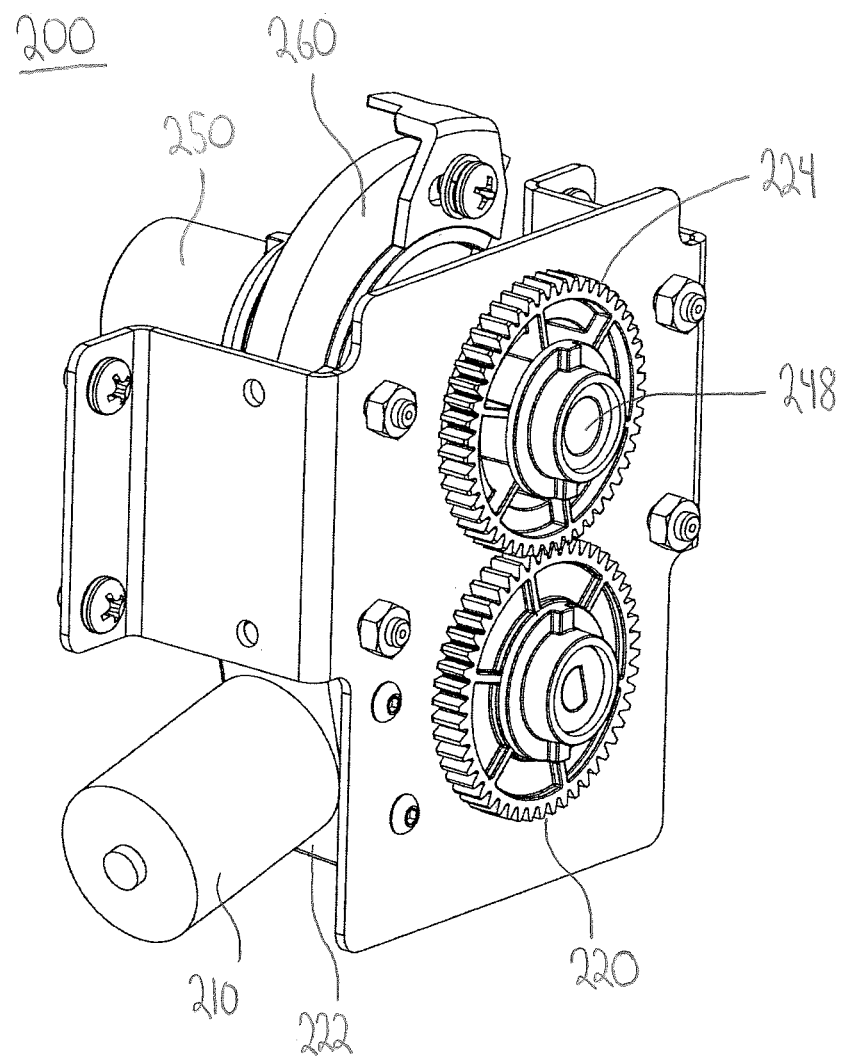
FIGS. 3A and 3B are perspective views of the motor assembly with and without a cooperating bushing retainer, respectively, and without and with a gear assembly retaining plate, respectively.
Figure 3B:
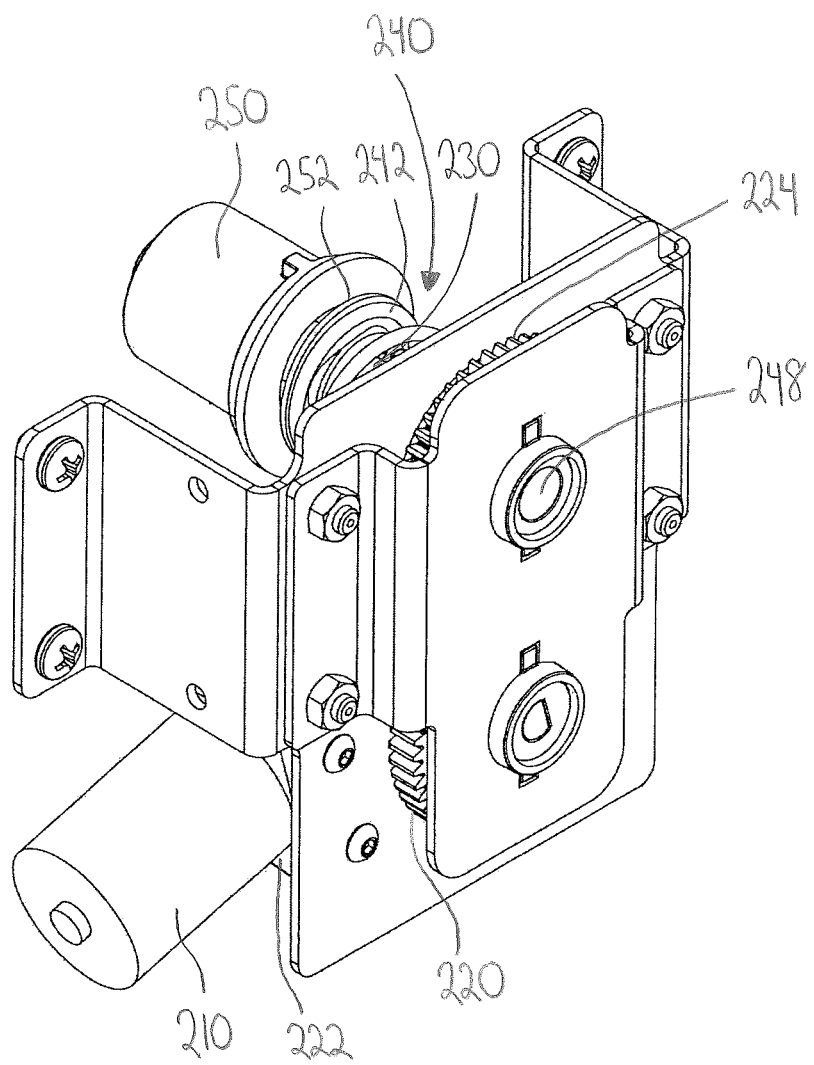

FIG. 3A shows the motor assembly 200 in isolation. The motor assembly may further include a bushing 250 which seats within the jamb 120 and blocks convective heat transfer through the jamb 120 from the heated compartment into the motor assembly. The bushing 250 may be retained within the jamb 120 by a bushing retainer 260 which at least partially encircles the bushing. As shown in FIG. 3B, the bushing 250 is otherwise coaxially mounted around the driven shaft 230, and may provide a seat 252 for a clutch spring 242 of the slip clutch. In motor assemblies that lack a bushing 250, the driven shaft 230 would extend through a bare aperture in the jamb 120 to the door 100 or to any driven gear assembly, multi-point linkage, or other mechanism for pivoting that is provided. In motor assemblies that lack a bushing 250, the jamb 120 would function as or provide a seat for clutch spring 242.

Figure 4:
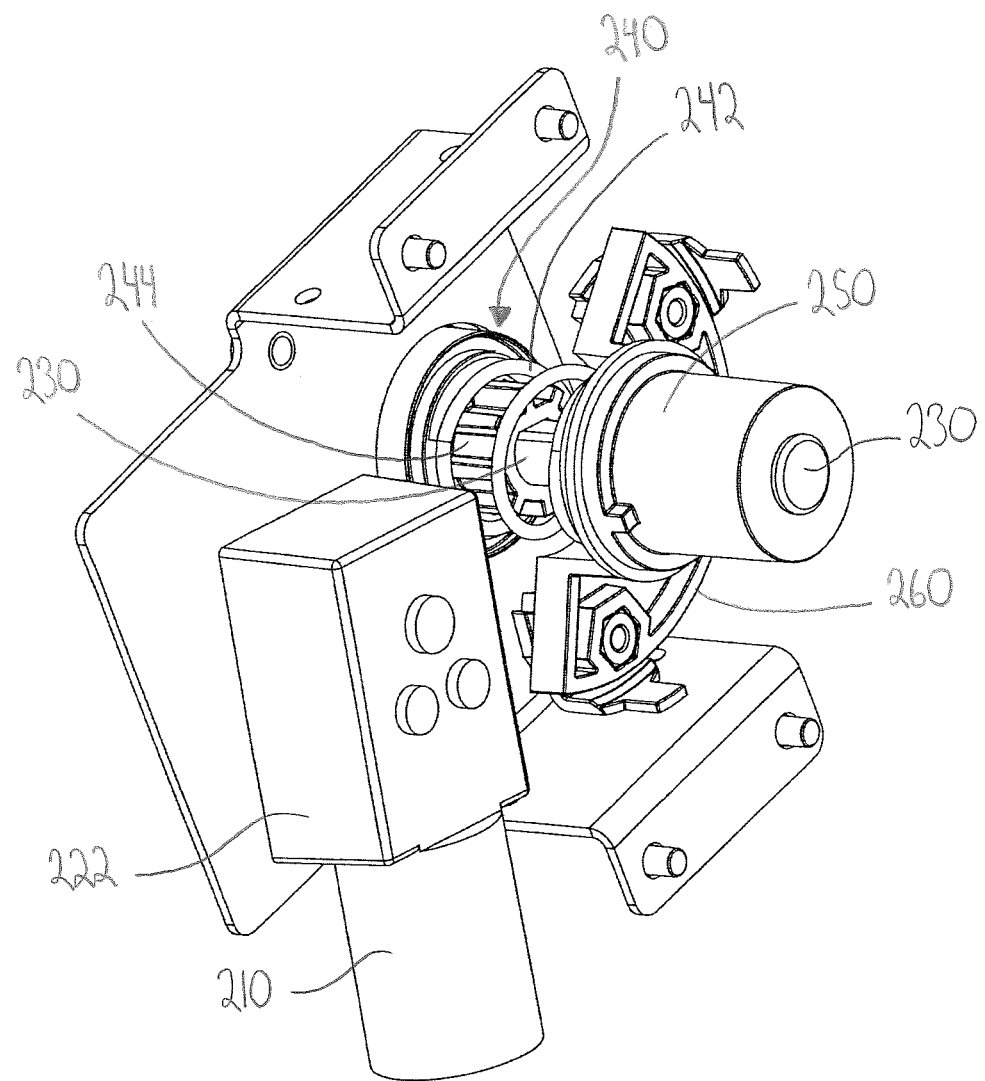
FIG. 4 is a perspective view of the opposite side of the motor assembly shown in FIG. 3A.
Figure 5:
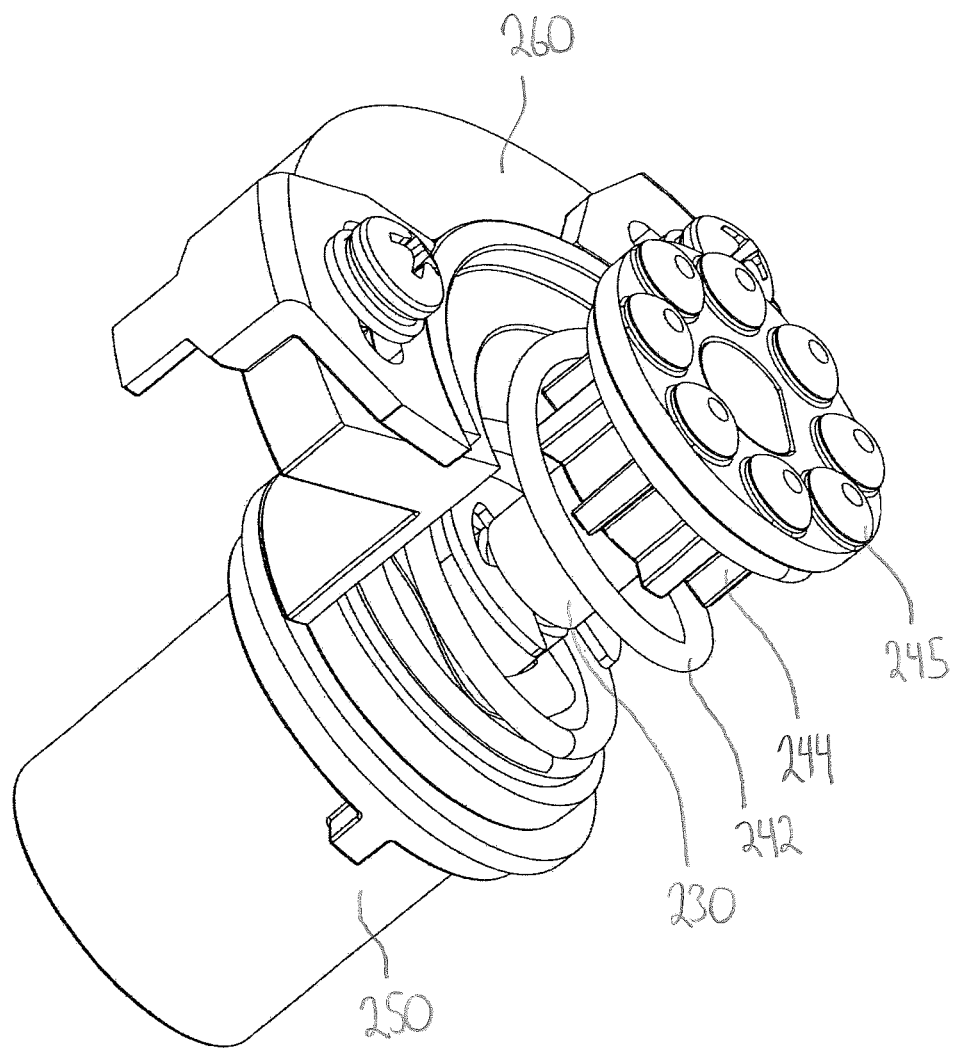
FIG. 5 is a perspective view of the driven portion of the slip clutch element.
Figure 6:
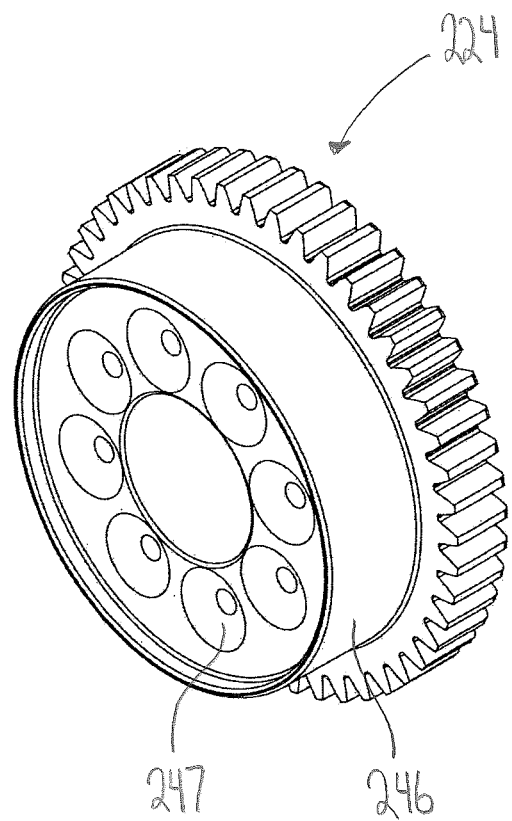
FIG. 6 is a perspective view of a face of a drive portion of the slip clutch element.

FIG. 4 shows the other side of the motor assembly 200 shown in FIGS. 3A and 3B. In addition to the clutch spring 242, the slip clutch 240 includes a clutch plate 244 that is slidable along the driven shaft 230 and has profiled clutch plate face (shown in FIG. 5) and a drive plate 246 (shown in FIG. 6) that has a counter-profiled drive plate face. The drive plate may be a separate part mounted on a drive shaft 248 driven by the plurality of drive gears 220, but may advantageously be integral with a drive gear 224. FIG. 6 shows an example of such a drive gear. One of the clutch and drive plate faces, e.g. the profiled clutch plate face, may include regular pattern of convex rounded projections 245 and the other of the clutch and drive plate faces, e.g., the counter-profiled drive plate face, may include a corresponding pattern of concave rounded dimples 247. The spring force of the clutch spring 242 and profile of the faces of the clutch and drive plates 244, 246 define the maximum torque that may be transmitted through the slip clutch, with torque in excess of the maximum causing the profiled clutch face plate to ride out of the counter-profiled drive plate face and break rotational engagement of the driven shaft 230 with the plurality of drive gears 220 (i.e., drive shaft 248 or drive gear 224). Accordingly, proper definition of the maximum torque by selection of the spring force and profiles of each face can mitigate a risk of pinch injury at pinch point 132 upon closing of door 100. Definition of the maximum torque by selection of the spring force and profiles of each face can also mitigate a risk of pinch injury at pinch point 134 upon opening of door 100, but may require a lower maximum torque since pinch point will be closer to the pivot axis 130 and can likely exert greater force at a particular level of torque.

Figure 7:
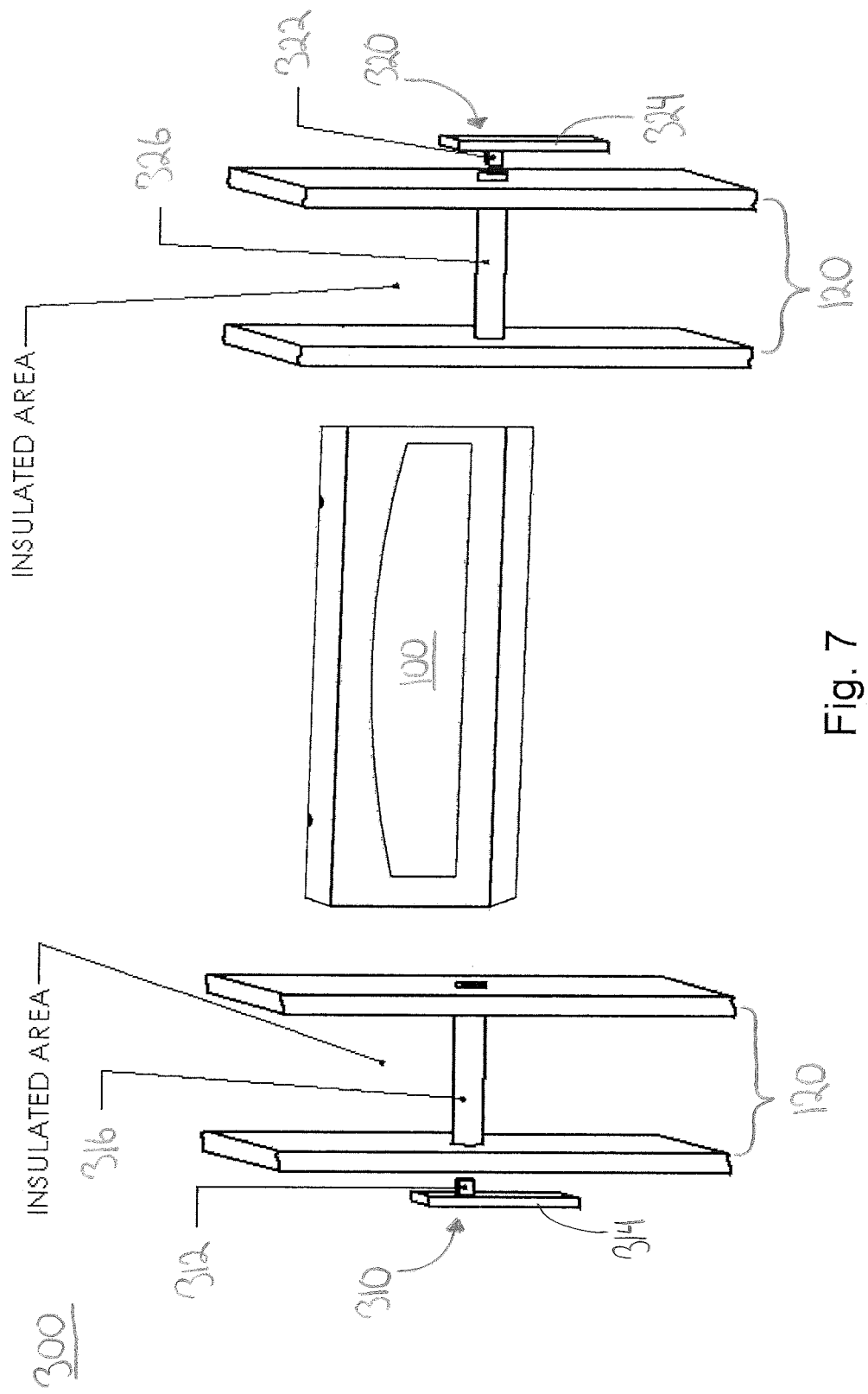
FIG. 7 is a schematic view of a break beam emitter and break beam receiver positioned across a (partial) door frame and upon/with the jambs of the frame.

In a second aspect, FIG. 7 illustrates a break beam device 300 bracketing a door frame and, specifically, mutually opposing jambs 120*a* and 120*b*. With reference to FIG. 1, a first break beam device 300 may be positioned at a door-opening side of door frame jambs 120*a* and 120*b* proximate to, but not adjoining, the door's closed position. Thus, a break beam emitter 310*a* and break beam receiver 320*a* may be disposed along a beam axis parallel to the pivot axis 130 and proximate the edge of door 100 opposite the pivot axis 130. The emitter 310*a* and receiver 320*a* are operatively connected to a control board 330 (shown in FIG. 2), and interruption of a light beam projected along the beam axis between the emitter 310*a* and receiver 320*a* alters a signal of the operative connection (e.g., interrupts a signal generated by the receiver upon receipt of the emitted beam). The beam axis thus serves to detect intrusion into the first pinch point 132, where closure of the door may potentially capture an extremity such as a finger, hand, or forearm of a customer reaching within the enclosed space of a compartment. Optionally, a second break beam device 300 may be positioned at a door-opening side of door frame jambs 120*a* and 120*b* proximate to, but not adjoining, the door's open position. Thus, a break beam emitter 310*b* and break beam receiver 320*b* may be disposed along a beam axis parallel to the pivot axis 130 and proximate the edge of door 100 adjacent to the pivot axis 130. The emitter 310*b* and receiver 320*b* may be operatively connected to the same control board 330, and interruption of a light beam projected along the beam axis between the emitter 310*b* and receiver 320*b* alters a signal of the operative connection (e.g., interrupts a signal generated by the receiver 320*b* upon receipt of the emitted beam from emitter 320*a*).

Altering the signal of the operative connection so as to indicate an interruption of the light beam may cause the control board 300 to halt operation of the motor assembly 200. Alternately, altering the signal of the operative connection so as to indicate an interruption of the light beam may cause the control board 300 reverse operation of the motor assembly 200. Any reversal of operation may be dependent upon the operating state of the motor assembly 200. For example, when the motor assembly is closing the door 100, but not opening the door 100, altering the signal of the operative connection for the device 310*a*/320*a* may trigger the control board 330 to open the door 100. For further example, when the motor assembly is opening the door 100, but not closing the door 100, altering the signal of the operative connection for the device 310*b*/320*b* may trigger the control board 330 to close the door 100.

Returning to FIG. 7, a break beam emitter 310 may comprise an LED 312, supporting electronics 314 (such as an LED driver, diagnostic circuitry, and the like) and a light pipe 316 disposed over the emitting surface of the LED 312. The light pipe may comprise a linear or curvilinear segment of transparent plastic such as polycarbonate, or of a transparent glass such as silica glass. The light pipe may be a segment of fiber optic cabling. As shown in FIG. 6, the emitter 310 is mounted with the light pipe 316 extending through the jamb 120, which is preferably hollow to reduce conductive heat transfer and even more preferably filled with an insulation to reduce convective transfer from the heated compartment. The light pipe 316 and jamb 120 thereby protect the LED 312 and supporting electronics 314 from most conductive and convective heat transfer from the compartment.

A break beam receiver 320 may comprise a photodiode 322, supporting electronics 324 (such as an amplifier, diagnostic circuitry, and the like) and a light pipe 326 disposed over the receiving surface of the photodiode 322. The light pipe may comprise a linear or curvilinear segment of one of the above-described materials, but need not be made from the same material. As shown in FIG. 7, the receiver 320 is mounted with the light pipe 326 extending through the opposing jamb 120, which again is preferably hollow to reduce conductive heat transfer and even more preferably filled with an insulation to reduce convective transfer from the heated compartment. The light pipe 326 and jamb 120 thereby protect the photodiode 322 and supporting electronics 324 from most conductive and convective heat transfer from the compartment.

Although the invention is shown and described with respect to certain aspects and embodiments, it should be clear that modifications will occur to those skilled in the art upon reading and understanding the specification, and the present invention includes all such modifications.

What is claimed is:

1. A motorized door assembly comprising:
a door positioned between opposing jambs of a door frame and movable between an open position and a closed position, wherein the door is pivotable about a pivot axis extending across the opposing jambs; and
a motor assembly mounted adjacent to the door, the motor assembly comprising:
an electric motor;
a plurality of drive gears;
a slip clutch; and
a driven shaft operably connected to the door to pivot the door about the pivot axis;
wherein the slip clutch includes a clutch plate that is slideable along the driven shaft, a drive plate driven by the electric motor via the drive gears, and a clutch spring urging the clutch plate into engagement with the drive plate, the clutch plate having a profiled face and the drive plate having a counter-profiled face for engagement with the profiled face.

2. The motorized door assembly of claim 1 wherein the motor assembly is mounted to one of the opposing jambs, opposite the door of the motorized door assembly.

3. The motorized door assembly of claim 2 wherein the motor assembly includes a bushing seated within the one of the opposing jambs, the bushing being coaxially mounted around the driven shaft.

4. The motorized door assembly of claim 3 wherein the clutch spring seats against the bushing, and the bushing is retained with the one of the opposing jambs by a bushing retainer which at least partially encircles the bushing.

5. The motorized door assembly of claim 1 wherein the electric motor is oriented perpendicular to the pivot axis, and the plurality of drive gears include a right angle gearbox.

6. The motorized door assembly of claim 1, wherein the driven shaft and the pivot axis are coaxial.

7. The motorized door assembly of claim 1, wherein the drive plate is integral with a drive gear.

8. The motorized door assembly of claim 1, wherein one of the clutch plate and the drive plate includes a regular pattern of convex rounded projections, and the other one of the clutch plate and the drive plate includes a corresponding pattern of concave rounded dimples.

9. A motorized door assembly comprising:
a door positioned between opposing jambs of a door frame and movable between an open position and a closed position, wherein the door is pivotable about a pivot axis extending across the opposing jambs;
a motor assembly operably connected to the door to pivot the door about the pivot axis;
a control board controlling the motor assembly;
a first break beam emitter mounted to one of the opposing jambs and operatively connected to the control board; and
a first break beam receiver mounted to the other one of the opposing jambs and operatively connected to the control board;
wherein the first break beam emitter and first break beam receiver are disposed along a beam axis extending parallel to the pivot axis and proximate to an edge of the door opposite the pivot axis, and wherein interruption of a light beam projected along the beam axis between the first break beam emitter and the first break beam receiver alters operation of the motor assembly.

10. The motorized door assembly of claim 9 wherein the first break beam emitter comprises an LED and a light pipe disposed over an emitting surface of the LED, with the light pipe extending through the one of the opposing jambs.

11. The motorized door assembly of claim 10 wherein the one of the opposing jambs is structurally hollow.

12. The motorized door assembly of claim 11 wherein the one of the opposing jambs is filled with an insulation.

13. The motorized door assembly of claim 9 wherein the second break beam emitter comprises a photodiode and a light pipe disposed over a receiving surface of the photodiode with the light pipe extending through the other one of the opposing jambs.

14. The motorized door assembly of claim 13 wherein the other one of the opposing jambs is structurally hollow.

15. The motorized door assembly of claim 9 wherein upon interruption of the light beam the control board stops operation of the motor assembly.

16. The motorized door assembly of claim 9 wherein upon interruption of the light beam the control board, when the motor assembly is closing the door, reverses operation to open the door.

17. The motorized door assembly of claim 9, further comprising:
a second break beam emitter mounted to one of the opposing jambs and operatively connected to the same or another such control board; and
a second break beam receiver mounted to the other one of the opposing jambs and operatively connected to the same or the other such control board;
wherein the second break beam emitter and second break beam receiver are disposed along another beam axis extending parallel to the pivot axis and proximate to an edge of the door adjacent the pivot axis, and wherein interruption of another light beam projected along the other beam axis between the second break beam emitter and the second break beam receiver alters operation of the motor assembly.

18. The motorized door assembly of claim 17 wherein upon interruption of the other light beam the operatively connected one of the same or another such control board stops operation of the motor assembly.

19. The motorized door assembly of claim 17 wherein upon interruption of the other light beam operatively connected one of the same or other such control board, when the motor assembly is opening the door, reverses operation to close the door.

* * * * *